United States Patent [19]
Kimura

[11] Patent Number: 5,926,247
[45] Date of Patent: Jul. 20, 1999

[54] METHOD OF MANUFACUTURING SPECTACLES, AND SPECTACLE FRAMES USED THEREFOR

[75] Inventor: Toshio Kimura, Tokyo, Japan

[73] Assignee: Hoya Corporation, Tokyo, Japan

[21] Appl. No.: 08/825,548

[22] Filed: Mar. 19, 1997

[30] Foreign Application Priority Data

Dec. 27, 1996 [JP] Japan ........................... 8-351311

[51] Int. Cl.[6] .................. G02C 1/13; G02C 13/00
[52] U.S. Cl. ............................. 351/41; 351/178
[58] Field of Search ....................... 351/41, 42, 178, 351/200

[56] References Cited

U.S. PATENT DOCUMENTS 5,485,399  1/1996  Saigo et al. ............................. 351/178
5,592,248  1/1997  Norton et al. ........................... 351/200

FOREIGN PATENT DOCUMENTS

A 6-66776  3/1994  Japan .

*Primary Examiner*—Huy Mai
*Attorney, Agent, or Firm*—Oliff & Berridge, PLC

[57] ABSTRACT

A method of manufacturing spectacles by obtaining accurate frame shape information without performing a frame shape measurement in the spectacle store. In this method, frame shape information is first obtained after a spectacle frame is manufactured in a factory. Moreover, frame-related information, which includes the obtained frame shape information, or readout information, according to which this frame-related information is read out, is preliminarily added to the spectacle frame. Thereafter, in a spectacle store, the frame-related information is read from the spectacle itself or from a storage unit or the like by using the information added to the spectacle frame as a key. Thus, frame shape information, which is needed when obtaining lens processing information, is obtained therein. The present invention further provides a spectacle frame for use in this method.

17 Claims, 10 Drawing Sheets

43 ENVELOPE

MODIFICATION IN CASE LENSES ARE PROCESSED IN SPECTACLE STORE

CONVENTIONAL METHOD OF MANUFACTURING SPECTACLES

METHOD OF MANUFACUTURING SPECTACLES, AND SPECTACLE FRAMES USED THEREFOR

BACKGROUND OF THE INVENTION

1. Field of The Invention

The present invention generally relates to a method of manufacturing spectacles (or eyeglasses) and to frame spectacles used therefor. More particularly, the present invention relates to a method of manufacturing spectacles, by which the omission of a frame shape measurement to be performed in a spectacle store (namely, an optician shop) is made possible.

2. Description of The Related Art

Generally, the manufacture of spectacles is accomplished by performing the following procedure so as to obtain spectacles. Namely, lens processing information required for the manufacture of spectacles is first obtained according to information which includes prescription values for the eyes of a spectacle (or eyeglass) wearer and frame shape information representing a spectacle frame selected by the wearer. Subsequently, the material of spectacle lenses is selected according to the aforesaid lens processing information and is then processed. Finally, the spectacle lenses obtained in this way are mounted to (or fitted into) the aforementioned spectacle frame.

Frame shape information is indispensable for this manufacture of spectacles. Further, it is one of the most important requirements for manufacturing comfortable spectacles that a processor (or a process manufacturer) accurately recognizes the frame shape information representing various shapes of spectacle frames.

In the case of performing a conventional method by which a processor knows this frame shape information, if the spectacle frame is a rimless frame or a partially (or partly) rimmed frame, a frame maker preliminarily supplies data, which represents two-dimensional plastic lens shape, to a spectacle manufacturer (for example, a spectacle store) as frame data, simultaneously with the shipment of the spectacle frame. Then, the spectacle manufacturer takes out a pattern (or a former) corresponding to the frame number of the spectacle frame chosen by a customer and further mounts the pattern on a lens processing machine (namely, an edger). Subsequently, the edging of lenses are carried out by performing the tracing (or copying or profiling) thereof.

The aforementioned conventional method using the pattern (or former), which are designated by the frame shape information representing spectacle frames, has a merits in that desired frame information can be easily obtained, in the case where the shapes of the spectacle frames are simple and the number of kinds of the shapes thereof is small and a manufacture error is small. However, in the case that the number of kinds of the spectacle frames has increased considerably and that there has been a rapid increase in the number of modifications of the shapes of the spectacle frames, it is obvious that there is a limit to the number of such patterns (or formers) which a spectacle manufacturer (or a process manufacturer) can retain, even if the manufacturer wishes to posses all of the formers respectively corresponding to the kinds of the shapes of the spectacle frames.

Thus, in recent years, an edger, which is a combination of a frame shape measuring apparatus (or unit) and a lens processing machine (or unit) in one (piece), has come into wide use. This edger is adapted so that the frame shape measuring unit measures (or obtains) frame shape information directly and actually and further transmits information representing a result of the actual measurement (namely, the actually obtained frame shape information) to the lens processing unit whereupon lenses are processed in a desired manner by using the combination of this frame shape information, lens information, prescription values, layout information and processing mode specification information or the like as lens processing information. This obviates the necessity of the patterns (or formers) as used in the conventional method. FIG. 14 illustrates an outline of the conventional spectacle manufacturing method. Incidentally, this figure illustrates both of the cases that the lens processing is performed in a spectacle store and that a processor (or a process manufacturer) is requested and processes lenses.

However, the aforementioned method using the edger has the following problems.

First, in the case of performing this method, it is necessary for obtaining frame shape information to set all of the spectacle frames, which are selected by customers, in the frame shape measuring apparatus individually and to perform the measurement of these frame shapes. However, certain measurement techniques and a measurement time having a certain length are necessary for such a measurement. Namely, to achieve an accurate measurement, there are required an operation of holding a spectacle frame on a measurement base, and the accuracy and speediness of operations. Further, generally, a system (or a method) employed by the frame shape measuring apparatus is a contact system by which a lens groove of the frame is traced by a measurement element (namely, a stylus) during the measurement element are kept pressed thereagainst. Thus, in some case, there is the necessity of taking a deformation of the frame, which is caused by a pressure at the time of such a measurement, into consideration. Moreover, there is a management control problem presented by considering the abrasion of the stylus. Furthermore, in the case that a spectacle store is crowded with customers, there is caused a problem that the processing takes time, because a plurality of operations cannot be performed at a time. Besides, even if the spectacle store or the processor possesses a plurality of edgers so as to prevent an occurrence of such a problem, there are caused problems in that the cost of equipment is huge and that it is very difficult to secure operators of the edgers and to manage and control the edgers.

The present invention is accomplished against the aforementioned background.

SUMMARY OF THE INVENTION

Accordingly, an object of the present invention is to provide a method of manufacturing spectacles, by which spectacles can be manufactured by obtaining precise frame shape information without measuring the shape of a spectacle frame in a spectacle store.

Further, another object of the present invention is to provide a spectacle frame for use in such a method.

To achieve the foregoing objects, in accordance with the present invention, there are provided the following means. Namely, in short, frame shape information is first obtained after a spectacle frame is manufactured in a factory. Moreover, frame-related (or frame relevant) information, which includes the obtained frame shape information), or readout information, according to which this frame-related information is read out, is preliminarily added to the spectacle frame. Thereafter, in a spectacle store, the frame-related information is read from the spectacle itself or from storage means or the like by using the information added to the spectacle frame as a key (or a clue). Thus, frame shape information, which is needed when obtaining lens processing information, is obtained therein. More specifically, the following methods of manufacturing spectacles and the following spectacle frames for use in such methods are provided in accordance with the present invention as means for achieving the foregoing objects.

Namely, to attain the foregoing objects, in accordance with a first aspect of the present invention, there is provided a method of manufacturing spectacles (hereunder sometimes referred to as a first method of the present invention) by obtaining lens processing information, which is necessary for processing spectacle lenses, according to information, which includes prescription values for eyes of a spectacle wearer and frame shape information representing a shape of a spectacle frame selected by the spectacle wearer, and subsequently selecting a material of spectacle lenses according to the lens processing information to thereby process and obtain spectacle lenses and thereafter mounting (or fitting) the obtained spectacle lenses to the spectacle frame. This method comprises the step of obtaining the frame shape information representing the spectacle frame in a factory after manufacturing the spectacle frame therein, the information adding step of adding framerelated information, which includes the obtained frame shape information, to the spectacle frame, the step of obtaining frame shape information, which is necessary when obtaining lens processing information concerning lenses to be mounted to (or fitted into) the spectacle frame selected by the spectacle wearer, by reading the frame-related information added to the spectacle frame.

Further, in the case of an embodiment (hereunder sometimes referred to as a second method of the present invention) of the first method of the present invention, the information adding step of adding the frame-related information to the spectacle frame comprises the storing sub-step of readably storing frame-related information, which includes the obtained frame shape information, in information storage means, and the readout information adding sub-step of adding readout information, according to which the frame-related information stored in this storage means is read therefrom, to the spectacle frame in the factory.

Furthermore, in the case of an embodiment (hereunder sometimes referred to as a third method of the present invention) of the second method of the present invention, the storing step comprises the sub-step of storing the frame-related information in a storage unit of a host computer (system) installed in the factory. Moreover, the step of reading the frame-related information stored in the aforesaid storage means comprises the sub-step of establishing the connection between a terminal unit installed in the spectacle store and the sub-step of reading the frame-related information online from the storage unit online to the terminal unit.

Besides, in the case of another embodiment (hereunder sometimes referred to as a fourth method of the present invention) of the second method of the present invention, the storing step comprises the sub-step of recording the frame-related information on an information recording storage medium through a host computer (system) installed in the factory. Moreover, the step of reading the frame-related information stored in the aforesaid storage means comprises the sub-step of reading the frame-related information, which is recorded on the recording storage medium distributed to the spectacle store, by a personal computer installed therein from the recording storage medium.

Additionally, in the case of an embodiment (namely, a fifth method of the present invention) of one of the first to fourth methods of the present invention, the frame shape information of the aforesaid spectacle frame is based on design values of data concerning the shape of the spectacle frame.

Besides, in the case of an embodiment (namely, a sixth method of the present invention) of one of the first to fourth methods of the present invention, the frame shape information of the aforesaid spectacle frame is based on actually measured values of data concerning the shape of the spectacle frame.

In addition, in the case of an embodiment (hereunder sometimes referred to as a seventh method of the present invention) of one of the first to fourth methods of the present invention, the frame shape information of the aforesaid spectacle frame is obtained by taking actually measured values of data, which represents the shape of the spectacle frame, and design values of the data, which represents the shape of the spectacle frame, into consideration.

Further, in the case of an embodiment (hereunder sometimes referred to as an eighth method of the present invention) of the seventh method of the present invention, the frame shape information of the aforesaid spectacle frame is minimum information according to which information representing the actual shape of the spectacle frame is obtained by performing a simulation based on both of the frame shape information and the design values of data representing the shape of the spectacle frame.

Moreover, in the case of an embodiment (namely, a ninth method of the present invention) of the seventh method of the present invention, the frame shape information of the aforesaid spectacle frame includes information representing the peripheral length of the aforesaid spectacle frame.

Furthermore, in the case of an embodiment (namely, a tenth method of the present invention) of one of the second to fourth methods of the present invention, the aforesaid readout information is product individual identification information according to which the individual product of the spectacle frame is identified.

Additionally, to achieve the foregoing objects, in accordance with another aspect of the present invention, there is provided a spectacle frame (hereunder sometimes referred to as a first spectacle frame of the present invention), to which spectacle lenses obtained by processing a material of lenses according to lens processing information obtained from information including prescription values for the eyes of a spectacle wearer and further including frame shape information are mounted (or fitted). Further, values of data representing the shape of the spectacle frame are actually measured after manufactured according to predetermined design specifications. Moreover, frame-related information including frame shape information obtained according to the actually measured values of the data is added to this spectacle frame.

Furthermore, in the case of an embodiment (hereunder sometimes referred to as a second spectacle frame of the present invention) of the first spectacle frame of the present invention, the aforesaid frame-related information is added directly to the second spectacle frame.

Additionally, in the case of another embodiment (hereunder sometimes referred to as a third spectacle frame of the present invention) of the first spectacle frame of the present invention, the aforesaid frame-related information is recorded onto an information recording storage medium in such a manner as to be integral with the third spectacle frame.

Further, in the case of still another embodiment (hereunder sometimes referred to as a fourth spectacle frame of the present invention) of the first spectacle frame of the present invention, the aforesaid frame-related information is recorded onto a medium which is separated from (the body of) the third spectacle frame but belongs (or connected) thereto.

Moreover, to achieve the foregoing objects, in accordance with yet another aspect of the present invention, there is provided another spectacle frame (hereunder sometimes referred to as a fifth spectacle frame of the present invention), to which spectacle lenses obtained by processing a material of lenses according to lens processing information obtained from information including prescription values for the eyes of a spectacle wearer and further including frame shape information are mounted (or fitted). Further, values of data representing the shape of the spectacle frame are actually measured after manufactured according to predetermined design specifications. Moreover, frame-related information including frame shape information obtained according to the actually measured values of the data is readably stored in an information storage unit. Furthermore, readout information, according to which the frame-related information is read from the information storage unit, is added to this spectacle frame.

Additionally, in the case of an embodiment of the fifth spectacle frame of the present invention, the aforesaid readout information is recorded directly onto (the body of) the spectacle frame itself.

Besides, in the case of another embodiment of the fifth spectacle frame of the present invention, the aforesaid readout information is recorded onto an information recording storage medium in such a manner as to be integral with the fifth spectacle frame.

Further, in the case of still another embodiment of the fifth spectacle frame of the present invention, the aforesaid readout information is recorded onto a medium which is separated from (the body of) the fifth spectacle frame but belongs (or connected) thereto.

Moreover, in the case of yet another embodiment of the fifth spectacle frame of the present invention, the aforesaid readout information is recorded on a bar code part integrally provided in (the body of) the aforesaid spectacle frame (namely, the readout information is contained in a bar code recorded or printed on the aforesaid spectacle frame).

As above described, in accordance with the methods of the present invention, in short, frame shape information is first obtained after a spectacle frame is manufactured in a factory. Moreover, frame-related, which includes the obtained frame shape information, or readout information, according to which this frame-related information is read out, is preliminarily added to the spectacle frame. Thereafter, in a spectacle store, the frame-related information is read from the spectacle itself or from storage means or the like by using the information added to the spectacle frame as a key. Thus, frame shape information, which is needed when obtaining lens processing information, is obtained therein. Consequently, in accordance with the present invention, the methods, by which spectacles are manufactured by obtaining accurate frame shape information without performing a frame shape measurement in the spectacle store, and the spectacle frames for use in the methods are obtained.

BRIEF DESCRIPTION OF THE DRAWINGS

Other features, objects and advantages of the present invention will become apparent from the following description of preferred embodiments with reference to the drawings in which like reference characters designate like or corresponding parts throughout several views, and in which.

DETAILED DESCRIPTION OF THE PREFERRED EMBODIMENTS

Figure 1:
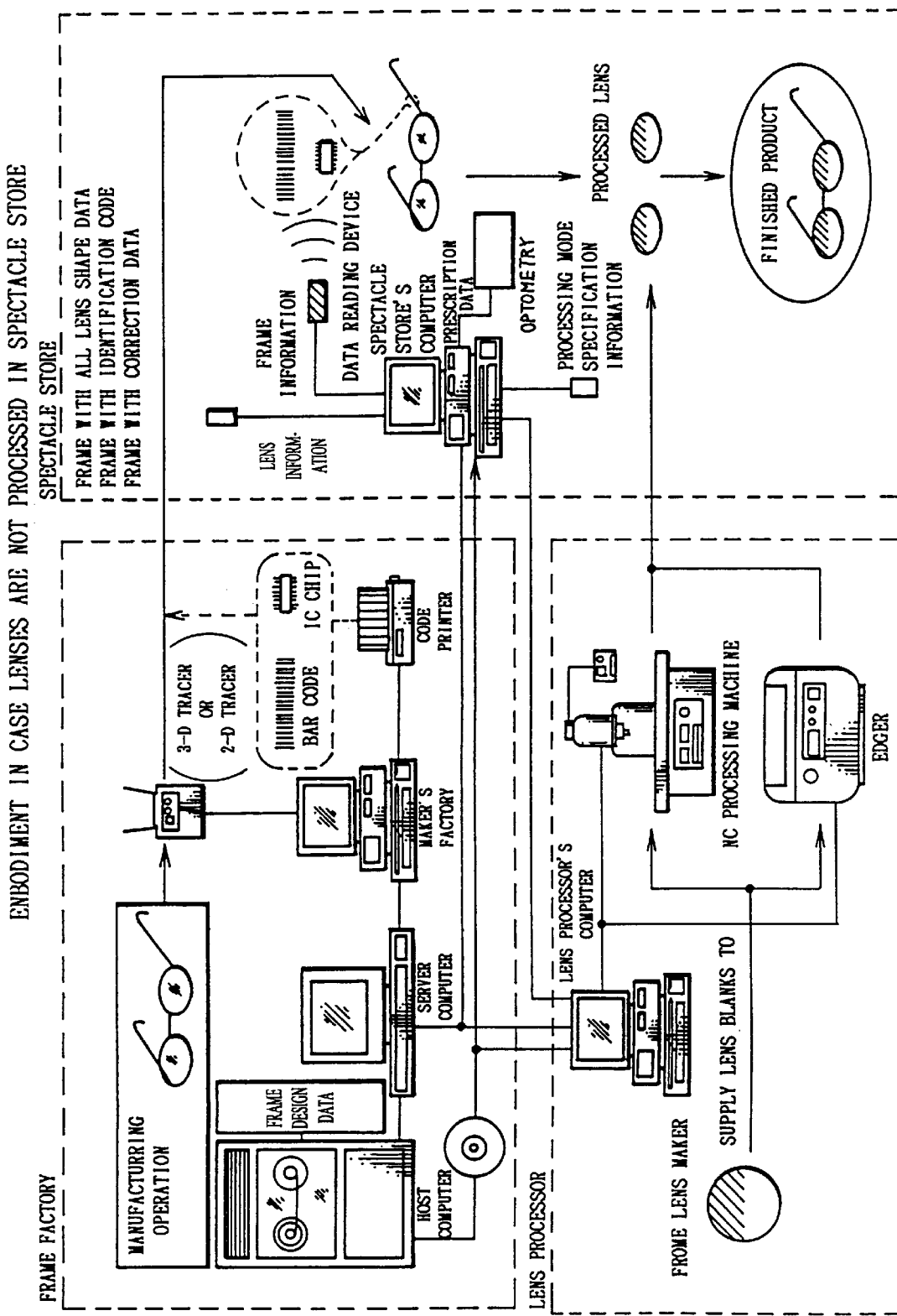
FIG. 1 is a diagram illustrating a method of manufacturing spectacles, which is an embodiment of the present invention.

FIG. 1 is a diagram illustrating an outline of a method of manufacturing spectacles, which is a first embodiment of the present invention. Hereinafter, this method of manufacturing spectacles, and a spectacle frame for use in this method, namely, the first embodiment of the present invention will be described in detail by referring to FIG. 1.

As is illustrated in this figure, this method of manufacturing spectacles, namely, the first embodiment of the present invention consists of: (1) a frame manufacturing step; (2) an actual frame shape measuring step; (3) a frame information adding step; (4) a frame information reading step; (5) lens processing information generating step; (6) lens processing step; and (7) a lens mounting step. Hereunder, these steps will be described in detail.

(1) Frame Manufacturing Step

Spectacle frames are manufactured in a frame factory. This manufacturing step depends on the kind of the material of the spectacle frame. In the case of employing a plastic frame, there have been publicly known two processes of manufacturing spectacle frames. Namely, one of the processes is a rim forming process by which a pattern (or former) for forming the spectacle frame of a predetermined shape is produced and then a plastic material is forced into the pattern. The other process is to cut out a spectacle frame of a predetermined shape from a flat plate by using a cutting machine. In this case, a spectacle frame is first designed. Then, frame shape data is generated. Subsequently, frame manufacturing design data used for manufacturing the spectacle frame is generated. Thereafter, the spectacle frame is manufactured according to the generated data. These processes are performed by using a main computer of the factory.

(2) Actual Frame Shape Measuring Step

The manufactured spectacle frame is set in a frame shape measuring apparatus. If the shape of the frame is simple, it is sufficient to obtain two dimensional data by this measurement. In contrast, if the shape of the frame is complex, it is preferable to obtain three dimensional data by this measurement. Basically, when positional data representing positions measured from a measurement reference point is given, those skilled in the art can obtain the shape of the frame by calculation. At that time, as will be described later, a three-dimensional cylindrical coordinate system is used. Further, more accurate shape data is obtained by inputting information representing the peripheral length of the frame, the frame PD (Pupillary Distance (namely, the distance between the geometrical centers of the lenses)), the width of a nosepiece (more specifically, the distance between the spectacle lenses), the dimension or size A (namely, the maximum lateral width of the frame part (or rim)), the size or dimension B (namely, the maximum vertical width of the frame part) and the angle formed by the left and right frame parts. Especially, indexes (or indicators or parameters) representing the peripheral length of the frame and the angle formed by the left and right frame parts are unique items proposed by Applicant of the instant application. Incidentally, in the case of a rimless frame, two-dimensional data or information is employed.

Figure 2:
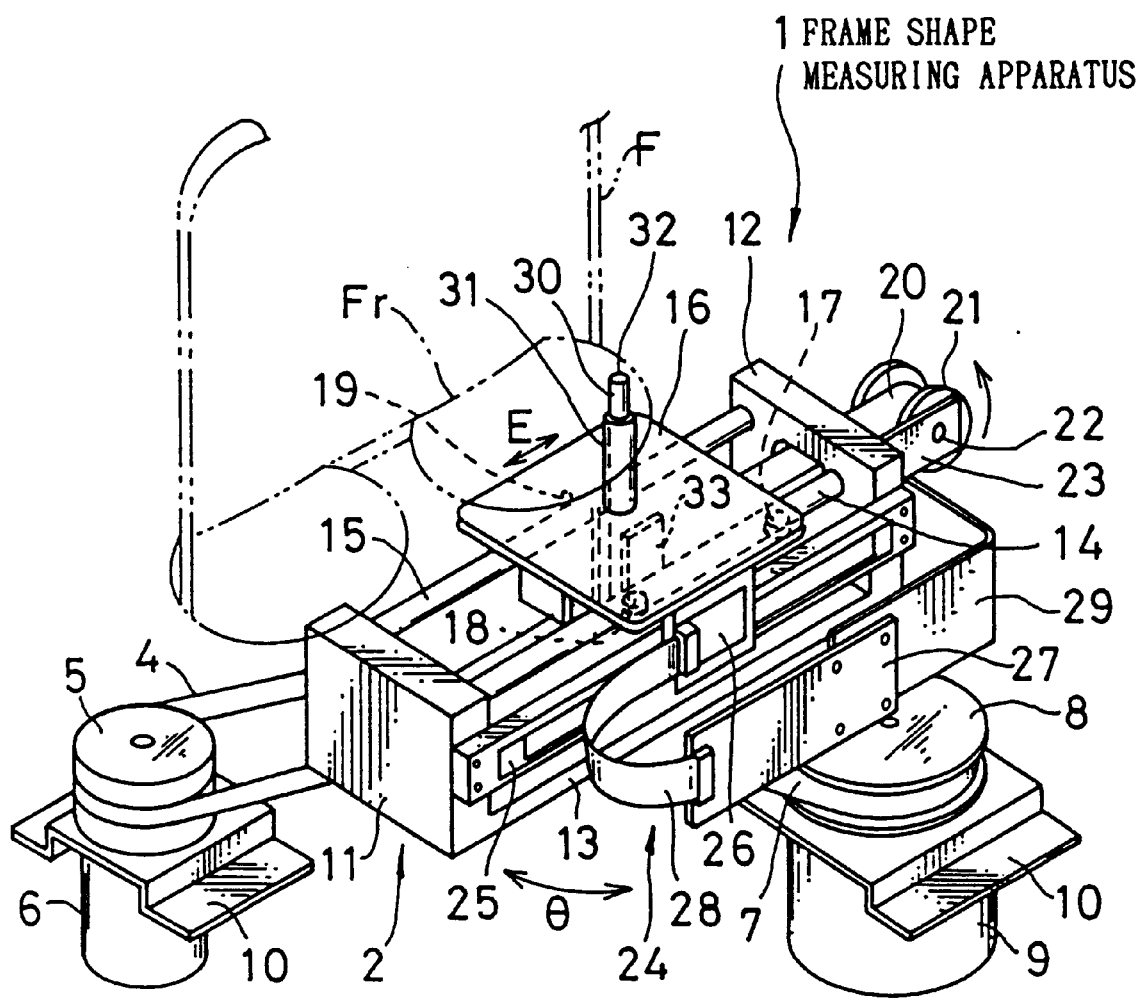
FIG. 2 is a perspective view of the configuration of a frame shape measuring apparatus.

FIG. 2 is a perspective view of the configuration of the frame shape measuring apparatus of this embodiment. This frame shape measuring apparatus is provided with a measuring portion 1 for measuring the shape of a spectacle frame rim Fr of a spectacle frame F held by a spectacle frame holding means (not shown) in such a manner as to be immovably fixed at a predetermined position or place. This measuring portion 1 has a U-shaped rotatable base 2, which is driven and rotated by a motor 6 in a direction * through the medium of a timing pulley (not shown), which is mounted on the bottom surface of the base 2, a timing belt 4 and another timing belt 5. The angle of rotation of the base 2 is detected by a rotary encoder connected to the aforementioned timing pulley (not shown) through a timing belt 7 and a timing pulley 8. The motor 6 and the rotary encoder 9 are fixedly mounted on a base plate 10 of this frame shape measuring apparatus (incidentally, although only a part of the base plate 10 is illustrated in FIG. 2 for easiness of viewing other components of the frame shape measuring apparatus, the base 10 actually extends all over a region under the rotatable base 2). Further, the aforesaid timing pulley (not shown) and the rotatable base 2 are rotatably journaled on the base plate 10 with bearings (not shown).

The rotatable base 2 of the measuring portion 1 consists of two side plates 11 and 12 and a rectangular center plate 13 for connecting the side plates together. Further, two slide guide shafts 14 and 15 are fixed between the side plates 11 and 12 in such a way as to extend in parallel with each other. Moreover, a horizontal slide plate 16 is slidably guided in a direction E by the guide shafts 14 and 15. To this end, the slide plate 16 has three rotatable three slide guide rollers 17, 18 and 19 attached to the bottom surface thereof. In this case, two of the slide guide rollers 17 and 18 are in contact with one of the slide guide shafts 14, while the remaining one of the slide guide rollers 19 is in contact with the other slide guide shaft 15. These slide guide rollers 17, 18 and 19 roll along the slide guide shafts 14 and 15.

The force of a constant force spring 20 is applied to the slide plate 16 in the sliding direction E and is thus pulled toward one of the side plates 12. This constant force spring 20 has an end thereof wound around a bushing 21 and is fixed to the side plate 12 through a shaft 22 and a bracket 23. The other end of the constant force spring 20 is attached to the slide plate 16. The constant force spring 20 serves to push a stylus 30 (to be described later) against the inner peripheral groove of the frame part (or rim) Fr.

Travel (or an amount of movement) R in the direction E of the slide plate 16 is measured by a reflection linear encoder 24 acting as a displacement measuring scale. This linear encoder 24 consists of: a scale 25, which extends between the side plates 11 and 12 of the rotatable base 2; a detector 26, which is fixed to the slide plate 16 and is adapted to move along the scale 25; and a flexible cable 28 for connecting the detector 26 with an amplifier 27. This amplifier 27 is mounted onto a bracket 29 fixed to the slide plate 12.

As the slide plate 16 moves, the detector 26 moves by maintaining a constant distance from the surface of the scale 25 thereto. The detector 26 outputs a pulse-like signal to the amplifier 27 through the flexible cable 28 connected thereto. The amplifier 27 amplifies this signal and outputs the amplified signal through a counter (not shown) as a signal representing the travel R.

Stylus 30 acting as a measuring element is held by the slide plate 16. This stylus 30 is supported by a sleeve 31, which is fixed to the slide plate 16, through a slide bearing in such a way as to be movable in the vertical direction (namely, in the direction of Z-axis) and to be rotatable in the sleeve 31. The stylus 30 has a head portion 32 shaped like a bead on an abacus. This head portion 32 is in contact with the inner peripheral groove of the spectacle frame rim Fr by the action of the constant force spring 20. The rotation of the rotatable base 2 causes the stylus 30 to move the inner peripheral groove of the spectacle frame rim Fr.

At that time, the stylus 30 moves in the direction of Z-axis in accordance with the curved surface of the frame rim Fr. The travel (or the amount of movement) of the stylus 30 (namely, the distance which the stylus moves) is detected by a Z-axis measuring device 33 formed as a displacement scale. This Z-axis measuring device 33 is fixed to the slide plate 16. Further, the movement in the direction of Z-axis of the stylus 30 is detected as an amount of a displacement Z by a built-in charge-coupled device (CCD) line image sensor and a light-emitting diode (LED) acting as a light source.

Next, an operation of the frame shape measuring apparatus having the aforementioned configuration will be described hereinbelow.

First, the spectacle frame F is fixedly held by the spectacle frame holding means (not shown). Further, the head portion 32 of the stylus 30 is made to be in contact with the V-shaped inner peripheral groove of the spectacle frame rim Fr. Moreover, the motor 6 is rotated by a control unit (not shown). Thereby, the rotatable base 2 connected thereto through the timing belt 4 rotates, so that the stylus 30 rolls during being in contact with the inner peripheral groove of the spectacle frame rim Fr. Rotation of the measuring portion 1 causes the rotary encoder 9, which is connected by the timing belt 7, to rotate and is detected as an angle of rotation ($\rho$). Amount of movement in a radial direction of the stylus 30 is detected by the linear encoder 24 as the travel R in the direction E of the slide plate 16. Further, the amount of movement in the vertical direction of the stylus 30 is detected by the Z-axis measuring device 33 as the amount Z of the movement in the direction of Z-axis thereof. Incidentally, these values of the cylindrical coordinates $\rho$, R and Z are not continuously measured but are intermittently measured every time the angle of rotation ($\rho$) increases by a predetermined amount. These input coordinates, thus, will be represented hereunder as three-dimensional measurement shape data $(R_n, \rho_n, Z_n)$ $(n=1, 2, 3, \ldots N)$ where N designates the number of times of measurements. In this case, point sequences and vectors represented by using a suffix "n" (incidentally, n=1, 2, 3, \ldots, N) are spatially arranged in the order of this suffix "n" and designate periodical data, whose period is N with respect to this suffix "n".

When the rotatable base 2 makes one revolution, the spectacle frame holding means slides by a predetermined amount or distance during holding the spectacle frame F. Thereby, the stylus 30 is set correspondingly to the other spectacle frame rim. Thus, the shape of this spectacle frame rim is measured. The predetermined distance, by which the spectacle frame holding means slides, is preliminarily set at a constant value. Therefore, the relative positional relation between both of the spectacle frame rims (or parts) is known from this preset value and measured data concerning the left and right spectacle frame rims Fr. Hereunder, this preset value will be expressed in three dimensional representation and will be referred to as relative positional data (□,□, □).

Figure 3:
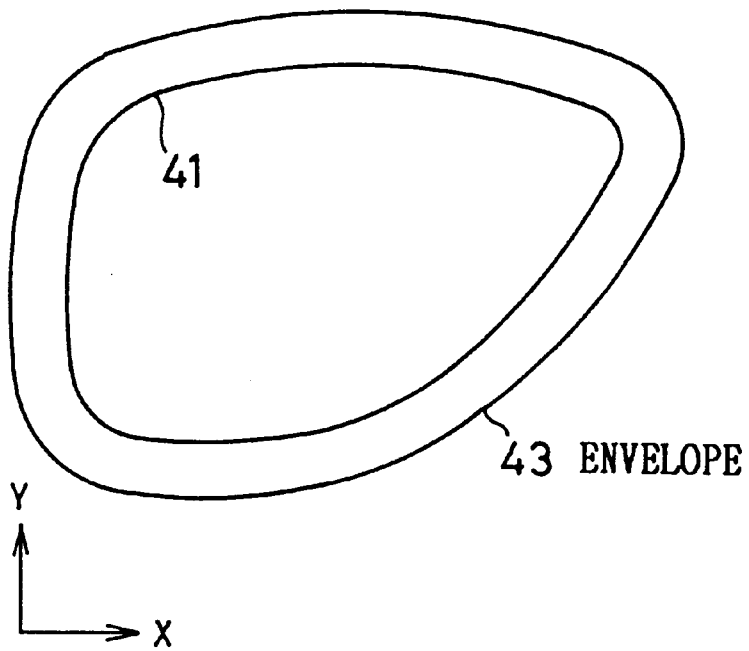
FIG. 3 is a diagram illustrating an offset measured by using a stylus of the frame shape measuring apparatus.
Figure 5:
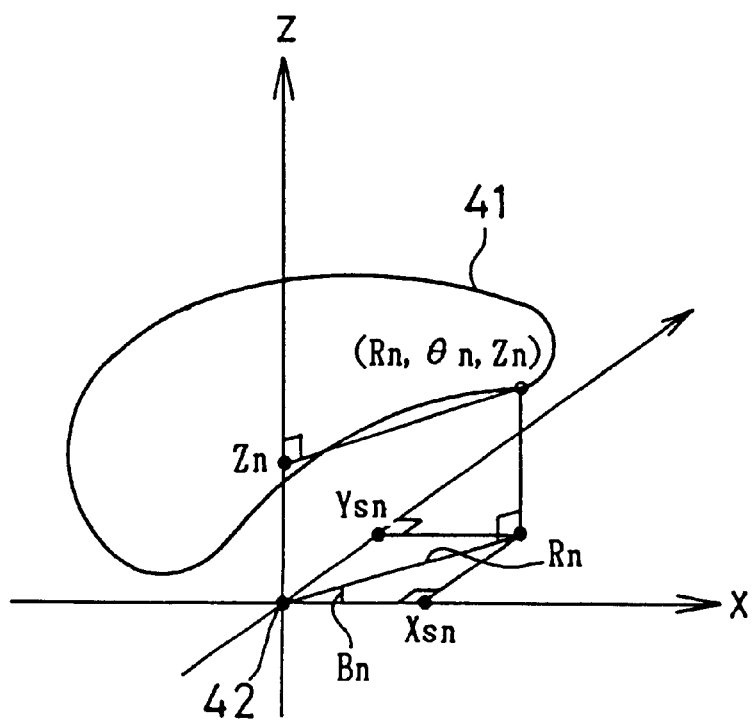
FIGS. 5, 6, 7, 8, 9 and 10 are diagrams for illustrating a method of measuring the shape of a spectacle frame by using the frame shape measuring apparatus.
Figure 4:
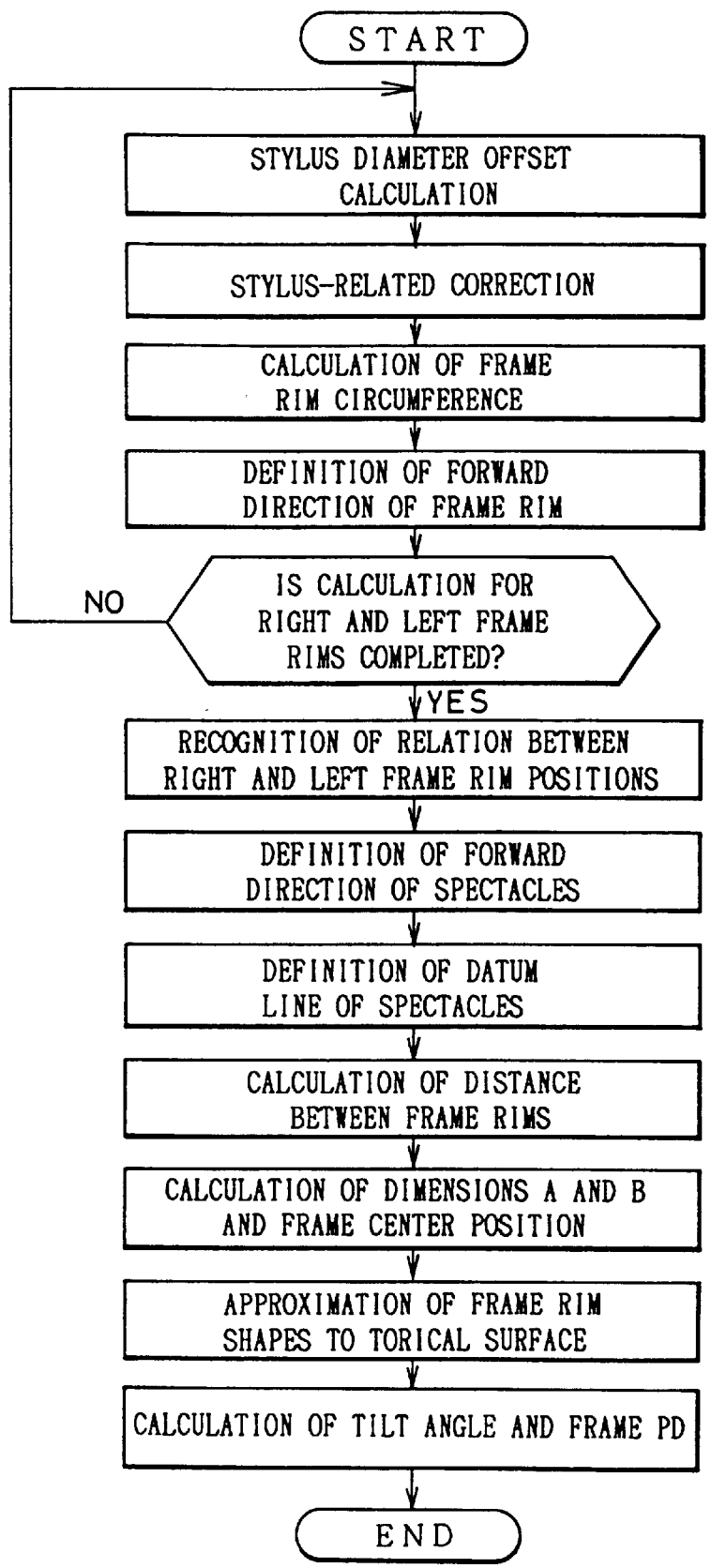
FIG. 4 is a flowchart for illustrating a process of calculating frame shape data.

As illustrated in FIG. 3, strictly, the primitive three-dimensional shape data (Rn, ρn, Zn) is data 41, which represents a path of the movement of the central axis of the head portion 32 of the stylus 30, and does not represent the inner peripheral groove of the spectacle frame rim. Thus, an envelope 43 drawn owing to an accurate shape of a spectacle frame rim (namely, drawn by a portion which is in contact with the bottom of the inner peripheral groove) should be obtained. Calculation for obtaining this envelope is referred to as an offset calculation. Needless to say, this offset calculation is unnecessary in the case of the measuring apparatus in which the stylus is directly in contact with the bottom of the inner peripheral groove of the spectacle frame rim. FIG. 4 is a flowchart for illustrating a method of calculating frame shape data. Incidentally, the details of this method are described in Japanese Patent Laid-Open No. Hei 6-66776/1994 Official Gazette, by which the invention proposed in Japanese Patent Application filed by Applicant of the present application is disclosed.

Figure 6:
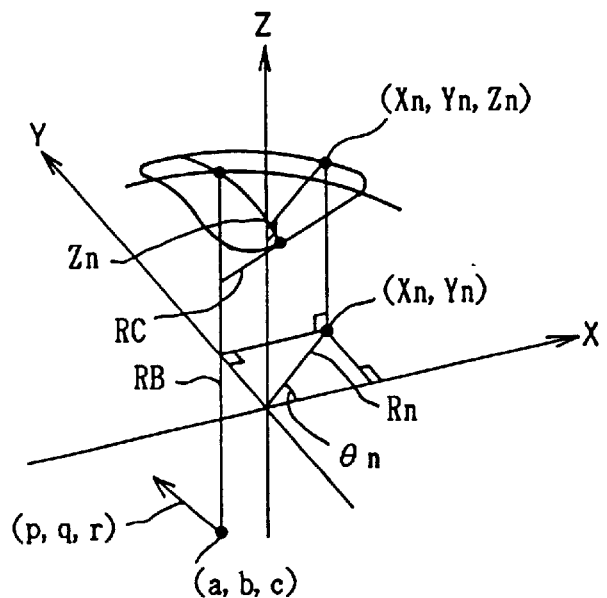
Figure 7:
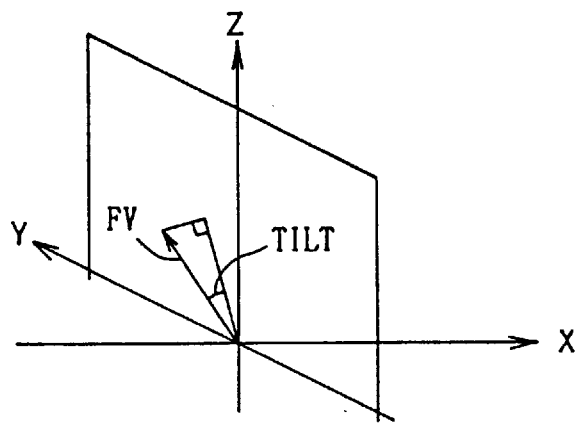
Figure 8:
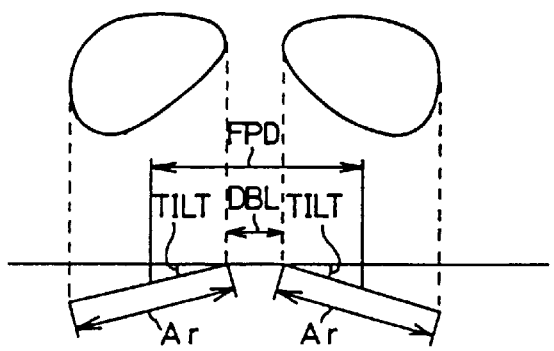
Figure 9:
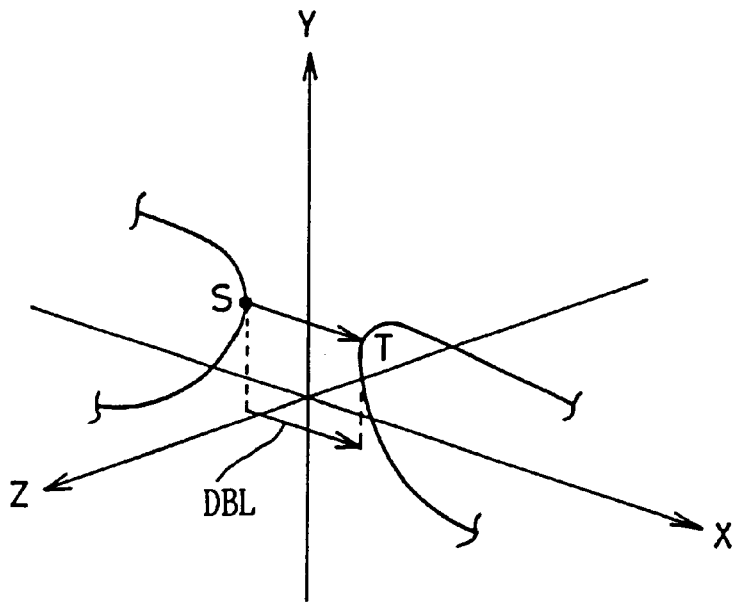
Figure 10:
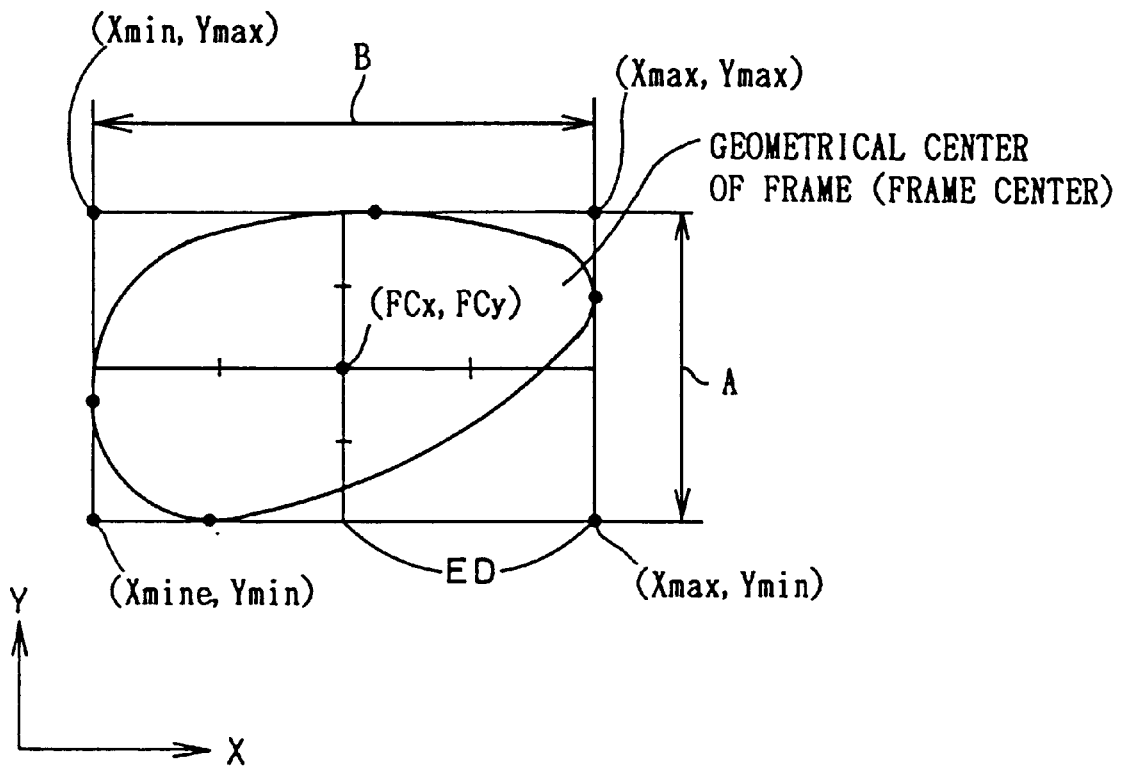

To obtain three-dimensional data by using this frame shape measuring apparatus, the frame is first set therein in a predetermined manner. Then,the stylus 30 is rotated around a predetermined point. Subsequently, the cylindrical coordinates (Rn, ρn, Zn) (n=1, 2, 3, . . . , N) representing the shape of the groove are detected in a three-dimensional manner. Then, data representing the detected coordinates is sent to the computer (system) whereupon a smoothing operation is performed on the data (incidentally, the smoothing operation is sometimes unnecessary). Thus, the center coordinates (a, b, c) of the torical surface, a base radius RB, a cross radius RC and a unit vector (p, q, r) in the direction of rotation symmetry of the torical surface as shown in FIG. 6, or a frame curve CV (namely, the curvature of a spherical surface in the case that a curved surface enclosed by the frame rim can be regarded as being this spherical surface), the peripheral length of the groove FLN, and a frame PD ((inter-)pupillary distance) FPD, the width of the nosepiece of the frame (namely, the distance between the (spectacle) lenses) DBL, the dimensions A and B (namely, the maximum lateral width of the frame part and the maximum vertical width of the frame part), an effective diameter ED (whose value is twice the value of the maximum radius) and a tilt angle TILT formed by the left and right frame parts (or rims), which are as illustrated in FIGS. 7, 8, 9 and 10, are calculated. Then, such calculated data is confirmed on the screen of a display device of the computer system. Incidentally, in the cases that there is caused a large disturbance in the data and that there is a large difference in shape between the left and right frame rims), a message indicating such a fact is displayed on the screen thereof. In the case where there is displayed a message indicating that there is caused the large disturbance, a measurement is performed once again after checking whether or not there is some deposit in the frame groove, whether or not slippage occurs at a join or seam portion in the frame rim, or whether or not the measurement has been performed by leaving a clearance between the surface of the groove and the stylus. Further, in the case where there is displayed a message indicating that there is a large difference in shape between the left and right frame rims, if such a difference therebetween is tolerable, an instruction, by which the system proceeds to the next step by ignoring or disregarding such a difference, is inputted. In contrast, if not tolerable, the measurement is performed once again after manually modifying the shape of the spectacle frame. Alternatively, what is called a merging operation may be performed by obtaining values of data representing an average shape of the shapes of the left and right frame rims and setting the obtained data as those of the spectacle frame shape data.

Finally, the frame shape data obtained in this way is stored in the storage unit of the computer system.

Incidentally, the process or method of measuring the shape of a frame is not limited to that of the aforementioned contact type using the stylus. For example, a method of the non-contact type using laser beams, infrared rays or X-rays, alternatively, a method of the image-processing type using a CCD camera or a digital camera may be employed.

(3) Frame Information Adding Step

It is important that the frame information actually measured by the aforementioned frame shape measuring apparatus is not frame design data but should be actual data actually measured by a frame maker (or manufacturer) when the frame is shipped. Namely, note that manufacture errors (for instance, in the case of a plastic frame, a shape error due to the difference in rate of polymerization or contraction among lots of materials, an error due to variation in processing accuracy among formers or patterns and a machining error caused by the frame shape cutting machines) are introduced into the actually measured data.

Further, in the frame maker, the actually measured frame (shape) data is stored in the host computer (system), in which a frame design program and so on are stored, as the (shape) data through a personal computer and a sever computer. In this host computer system, a spectacle-lens order receiving program, a spectacle-lens processing design program (including lens information concerning lenses in stock) and a beveling design program are further stored. Moreover, all of lens data, frame data, design data and processing data, which are used for manufacturing spectacles, and calculation programs for generating lens processing information are stored in this computer system. Incidentally, these data and programs may be recorded onto CD-ROMs and may be used by being loaded into the personal computers of the spectacle stores.

The aforementioned data is transmitted to an IC-chip manufacturing apparatus. Then, after all data concerning the spectacle frame are written to an IC-chip, this IC-chip is embedded in a suitable portion, for example, an inconspicuous portion of the temple of the spectacles and is held therein by a means such as the bonding thereof.

Figure 11:
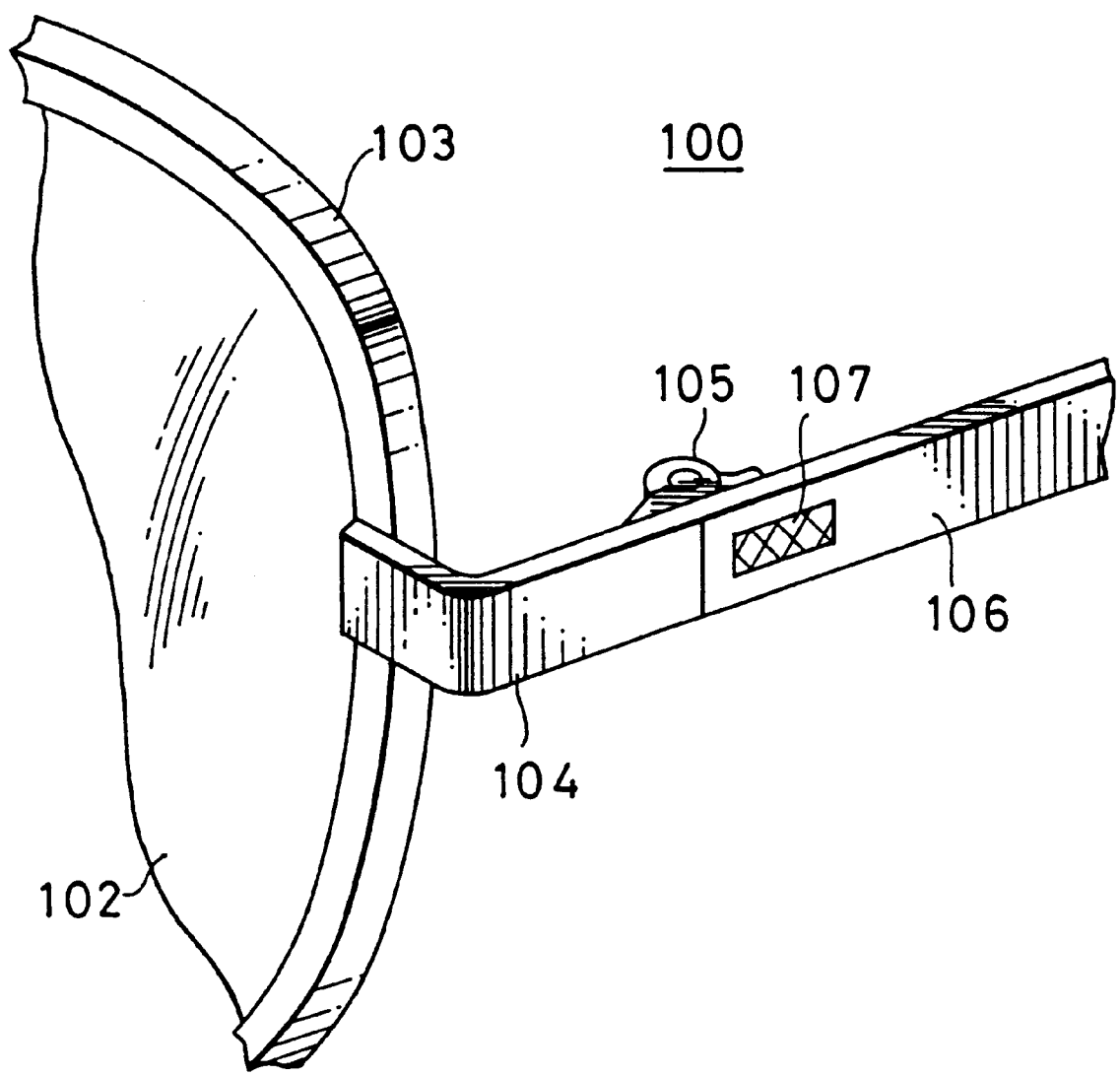
FIG. 11 is a diagram showing a spectacle frame embodying the present invention.

FIG. 11 illustrates a spectacle frame 100 provided with frame information. In this figure, reference character 102 denotes a lens; 103 a rim; 104 an endpiece; 105 a hinge; 106 a temple; and 107 an IC-chip to which the data is written.

Incidentally, in the case of this embodiment, the IC-chip is used as a medium for recording all shape data of a lens frame. In the case that the shape of the frame is complex, the (information) volume of information to be written to an IC-chip increases. Further, as the information volume increases, the higher accurate frame information is obtained. Thus, at the present time, an IC-chip is preferable as a medium whose memory capacity is large. Such a medium, however, is not limited to the IC-chip. Other storage media, for instance, IC (or smart) card, a bar code, a two-dimensional bar code (or QR code), an IC memory, a magnetic card, a floppy disk and a compact disk may be employed as such a medium.

Furthermore, in the case of the method of recording frame shape information (or data) in this embodiment, all data concerning the frame shape is loaded thereinto. However, it is not always necessary to load all of the data into the computer system. As long as a method of retrieving frame data from a data base, in which frame data are stored and managed, is established and identification characters for identifying individual frames are provided in the system, the addition of only the identification character to the spectacle frame may be employed. In such a case, a method of accessing the personal computers of the spectacle stores and the data base provided in the frame maker through circuits by using LAN, VAN and Internet may be employed as the method of retrieving frame data from the data base. In the eyeglass industry, for instance, HOYA online system and HOYA frame VAN system of Applicant of the present application have been already utilized. Moreover, there are other methods that are not such online methods. For instance, there is a method by which the frame data is first recorded on a certain recording storage medium (for example, CD-ROM, a floppy disk or the like) and then the recording storage medium is distributed to a user and is further loaded into the computer system of the user. Namely, in the case of this method, the maker provides the frame data by distributing recording media on which the frame data is recorded. Moreover, in the case of the online type methods (or systems), public lines of telecommunication, private (or leased) circuits, satellite communication systems and optical communication systems may be utilized.

Furthermore, a concrete (or practical) example of the identification character is "NLO59T XXXYYY". In this example, "NL" is an aberration of the trade mark "New Leaders" of a model of spectacles manufactured by the maker. Further, "059" indicates that the design No. of the frame, namely, the fifty-ninth model of the frame. Moreover, "T" denotes the material of the frame and is an aberration of the expression "titanium material". Additionally, "XXX" designates a manufactured lot No. to be represented by using numerical characters. Besides, "YYY" represents No. of an individual frame contained in this lot.

Besides, specific symbolic data representing the characteristics of the frame shape may be added to the spectacle frame, in addition to this identification character. A preferable concrete example is "Information (or Data) Representing Actually Measured Peripheral Length of Frame". In the case that this "Data (or Information) Representing Actually Measured Peripheral Length of Frame" is, for example, "50.08", if the spectacles of the bar code type is employed, this data is contained in the bar code as a 4-digit code. In this case, if the maker preliminarily supplies the design values of the frame shape and fundamental shape data to the spectacle store and the design data is "50.00" mm, it is supposed from the actually measured data "50.08" that the frame is expanded due to some cause and is thus deformed. Namely, the simulation of the frame shape is performed by calculating the ratio of a changed part of the peripheral length thereto from the difference between the actually measured peripheral length and the design value and combining the calculated ratio with the fundamental shape data.

Besides, as long as the shape of the frame is restored by using a certain index or parameter, the simulation of the frame shape is achieved by adding such a symbolic index or parameter to the spectacles.

Additionally, the data to be held in the system is compressed or reduced by storing only manufacturing (or processing) error data obtained from the comparison between the design data and the actually measure data. Thereby, the notation quantity is reduced. In this case, similarly, it is assumed that the fundamental data (for example, the design data) is held by the system when the shape data is restored.

Further, in addition to the method of embedding the IC-chip in the frame and bonding the chip thereto, for example, a method of adding the IC-chip as a tag may be employed as the method of adding the information or data to the spectacle frame. If possible, the frame may be directly engraved (or printed) with marks or the like, which represents the information or data. In the case that the frame is directly provided with the information or data, a step of processing the frame is increased, so that the number of steps increases, while the history of the frame is left thereon. Thus, this history is utilized as the frame information of the currently existing spectacles when repairing or replacing the frame, and is thus useful.

(4) Frame Information Reading Step

Next, in the spectacle store, the frame-related information such as the frame shape information is obtained by reading the information written to the embedded IC chip by the use of the information reading device connected to the computer of the spectacle store. As above described, if necessary, there is established the connection between the computer of the spectacle store and the host computer system of the maker, and then the information is read online therefrom. Thereby, the frame-related information required for manufacturing the spectacle lenses is obtained.

(5) Lens Processing Information Generating Step

Meanwhile, prescriptions for a customer are determined according to data obtained as a result of a medical examination and an eye examination(namely, an optometry or an opthalmoscopy), which are performed by an ophthalmologist. The prescription values and the kinds of the attached prescriptions depend upon the viewing environment of a patient. Generally, correcting vision, an axis of astigmatism and a pupillary distance are appended to the data.

Further, spectacle lenses are selected according to the aforementioned prescription information. Moreover, the material of the lenses (for example, plastics or glass), the lens specifications (namely, spherical or aspherical surface), an outer diameter and a lens thickness are determined.

Processing information is determined by synthesizing the aforementioned information. Hereat, a shift amount of inward and outward shifts, beveling position specification, a slabbing-off processing specification and "METS PROCESS" specification (minimum thickness specification) in the case of a progressive power lens are determined according to the view processing mode specification information desired by customers. If all of the calculation programs for generating lens processing information are installed in the personal computer of the spectacle store, all processing data is generated by inputting only the aforementioned data.

(6) Lens Processing Step

Figure 12:
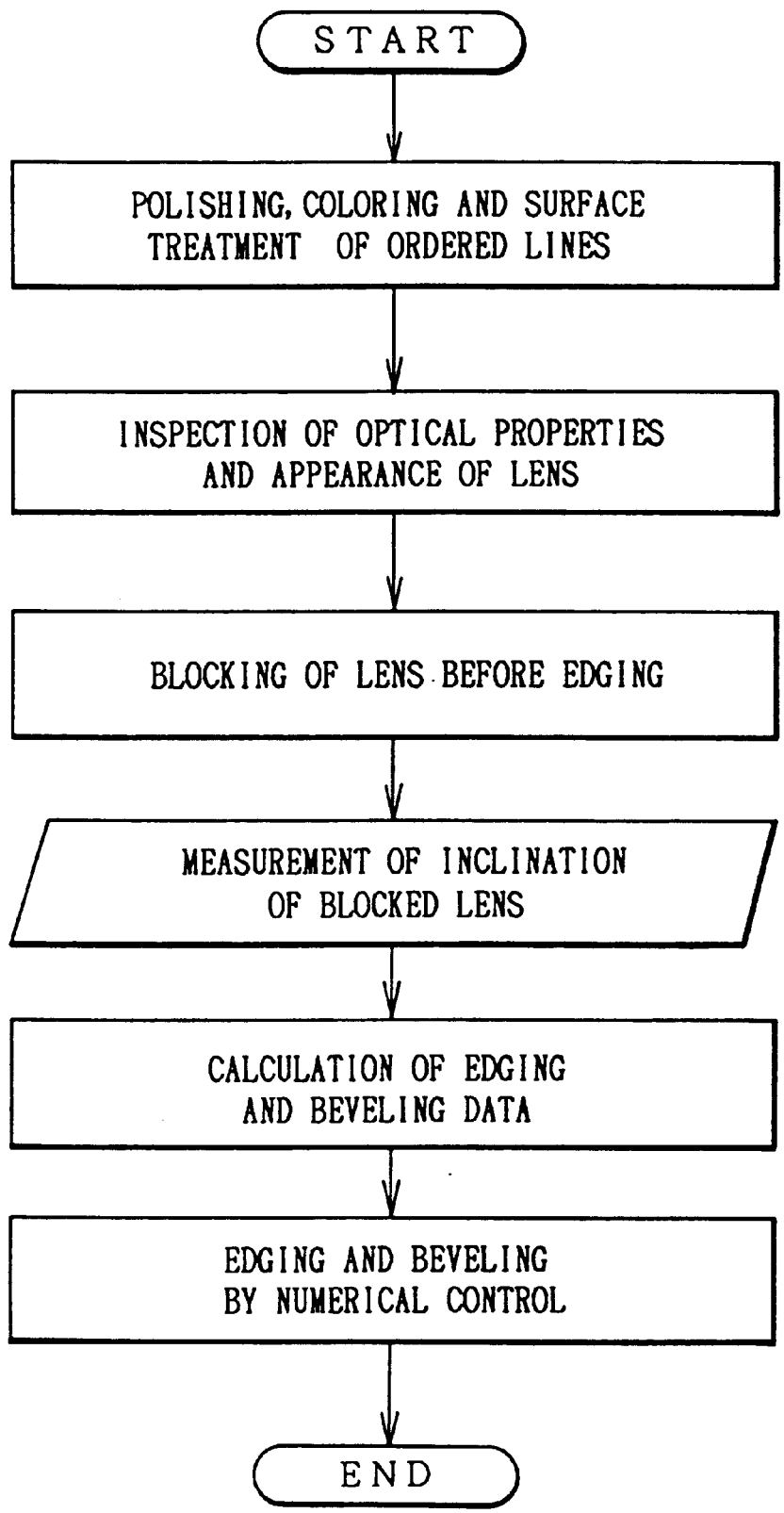
FIG. 12 is a flowchart illustrating a lens processing procedure.
Figure 13:
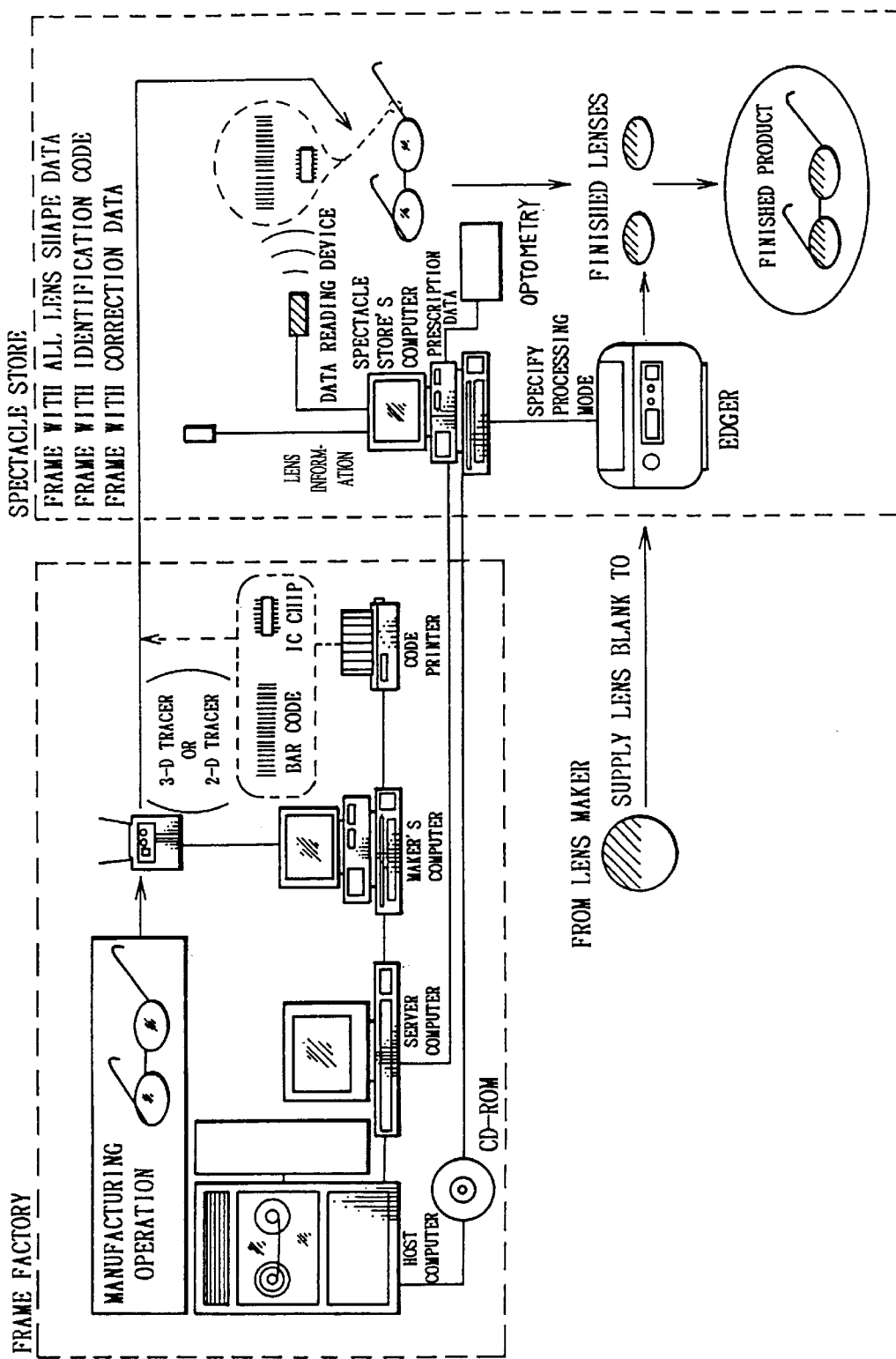
FIG. 13 is a diagram illustrating an outline of a modification of a method of manufacturing spectacles according to the present invention.
Figure 14:
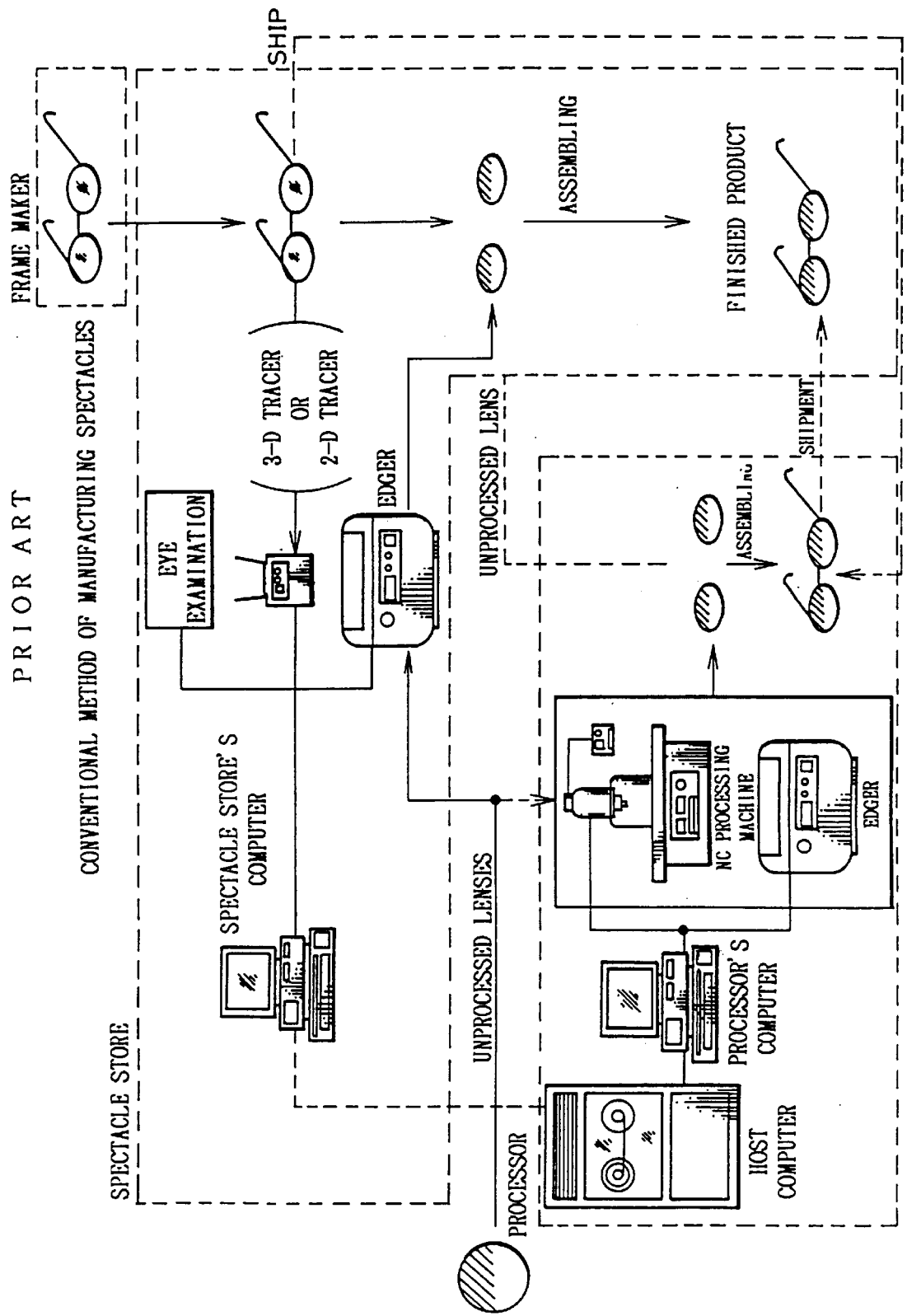
FIG. 14 is a diagram illustrating an outline of the conventional method of manufacturing spectacles.

Next, the processing information obtained in the aforementioned way is sent online to the computer of a process manufacturer together with order information or data. The process manufacturer selects the specified material of lenses according to the order information or data and then processes the lenses. This lens processing is performed by the edger or a numerical control (NC) processing machine. As is publicly known, the edging is first performed in such a lens processing apparatus. Then, the beveling is performed therein. Thus, a desired spectacle lens is obtained. FIG. 12 is a diagram illustrating an ordinary procedure of the lens processing. Incidentally, the aforementioned frame manufacturing factory may serve also as the lens process manufacturer (namely, the lens processor). Alternatively, the lens processor may be separated from the frame manufacturing factory.

Additionally, in the case of this embodiment, the frame maker commissions an outside processor to process the lenses. Namely, in this case, the maker takes full advantages of the (characteristic) features of the present invention. Further, in this case, the spectacle store has only to perform necessary minimum operations.

The present invention, however, is not limited to this embodiment. For example, the present invention may be applied to the case where the frame shape measurement is not performed in the spectacle store but the lens processing is carried out therein. FIG. 1 is a diagram illustrating this modification (namely, a second embodiment) of the aforementioned method of manufacturing spectacles according to the present invention. As is illustrated in this figure, this modification (namely, the second embodiment) is basically the same as of the first embodiment except that the lens processing is performed by an edger placed in the spectacle store instead of commissioning an outside processor to process the lenses.

Here, note that this modification has an advantage in that it is not necessary for the spectacle store to perform a troublesome frame shape measurement.

(7) Lens Mounting Step

In the case of the first embodiment, after receiving the ordered lenses from the processor, these lenses are mounted to (or fitted into) the frame. Thus, the spectacles are completed. In contrast, in the case of the modification (namely, the second embodiment), the lenses processed in the spectacle store are mounted to (or fitted into) the frame. Consequently, the spectacles are completed.

Although the preferred embodiments of the present invention have been described above, it should be understood that the present invention is not limited thereto and that other modifications will be apparent to those skilled in the art without departing from the spirit of the invention.

The scope of the present invention, therefore, should be determined solely by the appended claims.

What is claimed is:

1. A spectacle manufacturing method of processing non-processed lenses into shapes conforming with a spectacle frame and setting the processed lenses in said spectacle frame to complete spectacles, said method comprising:

a first step of manufacturing a spectacle frame and of measuring configurations of lens-accommodating portions of the manufactured spectacle frame to obtain frame configuration information representative of the measured configurations;

a second step of storing frame-related information including said frame configuration obtained in the first step in information storage means;

a third step of obtaining prescription values for eyes of a spectacle wearer;

a fourth step of reading out said frame-related information stored in said information storage means in the second step;

a fifth step of obtaining, on the basis of information including said frame configuration information obtained in the first step and said prescription values for said spectacle wearer's eyes obtained in the third step, lens processing information necessary for when non-processed lenses are processed into said shapes conforming with said spectacle frame and mounted in said spectacle frame, a sixth step of processing non-processed lenses in accordance with said lens processing information obtained in the fifth step to produce spectacle lenses fittable into said spectacle frame; and a seventh step of setting the produced spectacle lenses in said spectacle frame to complete the spectacles.

2. The method according to claim 1, wherein the frame configuration information about said spectacle frame is based on design values of data concerning the configuration of said spectacle frame.

3. The method according to claim 1, wherein the frame configuration information about said spectacle frame is based on actually measured values of data concerning the configuration of said spectacle frame.

4. The method according to claim 1, wherein the frame configuration information about said spectacle frame is obtained by taking actually measured values of data, which represent the configuration of said spectacle frame, and design values of the data, which represent the configuration of said spectacle frame, into consideration.

5. The method according to claim 4, wherein the frame configuration information according to which information representing the actual shape of said obtainable by performing a simulation based on the frame configuration information and on the design values of data representing the configuration of said spectacle frame.

6. The method according to claim 5, wherein the frame configuration information about the spectacle frame includes information representing a peripheral length of said spectacle frame.

7. The method according to claim 1, wherein the frame-related information includes product individual identification information according to which a product individual of said spectacle frame is identified.

8. A spectacle manufacturing method of obtaining lens processing information, necessary for processing spectacle lenses, on the basis of information including prescription values for eyes of a spectacle wearer and frame configuration information on a spectacle frame said spectacle wearer selects to choose and process spectacle lens material on the basis of the obtained lens processing information for producing spectacle lenses and of setting the produced spectacle lenses in said spectacle frame to manufacture spectacles, said spectacle manufacturing method comprising:

a first step of, on a factory side, manufacturing said spectacle frame and obtaining said frame configuration information on said spectacle frame;

a second step of, on said factory side, storing frame-related information including the obtained frame configuration information in information storage means to allow said frame-related information to be read out therefrom;

a third step of, on said factory side, adding reading information, on the basis of which said frame-related information stored in said storage means is read out therefrom, onto said spectacle frame; and a fourth step of obtaining said frame configuration information, needed for obtaining said lens processing information about said spectacle lenses to be set in said spectacle frame said wearer selects, by reading out said frame-related information from said storage means on the basis of said reading information added onto said spectacle frame on a spectacle store side.

9. The method according to claim 8, wherein, in the second steps, a host computer system is installed on said factory side and is equipped with a storage unit serving as said storage means for storing said frame-related information, and wherein, in said fourth step, a connection is established between said host computer system and a terminal unit installed on said spectacle store side, and said frame-related information is read out on-line from said storage unit of said host computer system to be put in said terminal unit on said spectacle store side.

10. The method according to claim 8, wherein, in said second step, said frame-related information is recorded on an information recording storage medium serving as said storage means through a host computer system installed on said factory side, and wherein, in said fourth step, said frame-related information recorded on said recording storage medium, which in turn is distributed to said spectacle store side, is read out by a personal computer installed on said spectacle store side.

11. A spectacle frame having a portion accommodating spectacle lenses formed in accordance with prescription values for eyes of a spectacle wearer, said spectacle frame including a portion on which frame-related information including frame configuration information representative of a configuration of said portion accommodating each of said lenses is directly recorded.

12. A spectacle frame having a portion accommodating spectacle lenses formed in accordance with prescription values for eyes of a spectacle wearer, said spectacle frame having a portion to which an information recording storage medium retaining frame-related information including frame configuration information representative of a configuration of said portion accommodating each of said lenses is integrally attached.

13. A spectacle frame having a portion accommodating spectacle lenses formed in accordance with prescription values for eyes of a spectacle wearer, said spectacle frame carrying an information recording storage medium retaining frame-related information including frame configuration information representative of a configuration of said portion accommodating each of said lenses, with said information recording storage medium being constructed as a separate device belonging to said spectacle frame itself.

14. A spectacle frame having a portion accommodating spectacle lenses conforming with prescription values for eyes of a spectacle wearer, said spectacle frame having a portion on which frame configuration restoration information is directly recorded, with said frame configuration restoration information being used to fetch frame configuration design information representative of a designed configuration of said spectacle frame portion accommodating each of said spectacle lenses from an information recording storage medium prepared, and the fetched frame configuration design information being used as processing information in processing said spectacle lenses.

15. A spectacle frame having a portion accommodating spectacle lenses conforming with prescription values for eyes of a spectacle wearer, said spectacle frame including portion carrying an information recording storage medium retaining frame configuration restoration information, with said frame configuration restoration information being used to fetch frame configuration design information representative of a designed configuration of said portion of said spectacle frame accommodating each of said spectacle lenses from another information recording storage medium prepared, and the fetched frame configuration design information being used as processing information in processing said spectacle lenses.

16. A spectacle frame having a portion accommodating spectacle lenses conforming with prescription values for eyes of a spectacle wearer, said spectacle frame including a portion carrying an information recording storage medium retaining frame configuration restoration information, said information recording storage medium being constructed as a separate device but belonging to said spectacle frame itself, with said frame configuration restoration information being used to fetch frame configuration design information representative of a designed configuration of said portion of said spectacle frame accommodating each of said spectacle lenses from another information recording storage medium prepared, and the fetched frame configuration design information being used as processing information in processing said spectacle lenses.

17. A spectacle frame having a portion accommodating spectacle lenses conforming with prescription values for eyes of a spectacle wearer, said spectacle frame having a portion on which frame configuration restoration information is recorded in the form of a bar code, with said frame configuration restoration information being used to fetch frame configuration design information representative of a design configuration of said spectacle frame portion accommodating each of said spectacle lenses from an information recording storage medium prepared, and the fetched frame configuration design information being used as processing information in processing said spectacle lenses.

* * * * *

UNITED STATES PATENT AND TRADEMARK OFFICE
CERTIFICATE OF CORRECTION

PATENT NO. : 5,926,247
DATED : July 20, 1999
INVENTOR(S) : Toshio Kimura

It is certified that error appears in the above-identified patent and that said Letters Patent is hereby corrected as shown below:

Claim 1, line 13, change "eves to --eyes--.

Replace claim 5 as follows:

--5. The method according to claim 4, wherein the frame configuration information about said spectacle frame is minimum information obtainable by performing a simulation based on the frame configuration information and on the design values of data representing the configuration of said spectacle frame.--

Signed and Sealed this

Third Day of October, 2000

Attest:

Attesting Officer

Q. TODD DICKINSON

Director of Patents and Trademarks